Dec. 11, 1956 J. WEISS 2,773,617

HIGH-SPEED LABELING DEVICE

Filed July 29, 1955 9 Sheets-Sheet 1

Inventor:
Johann Weiss
by Michael + Frey
Armand E. Michael

Dec. 11, 1956 J. WEISS 2,773,617

HIGH-SPEED LABELING DEVICE

Filed July 29, 1955 9 Sheets-Sheet 2

Inventor:
Johann Weiss
by Armand E. Mosten
(Mertmann Frey)

Inventor:
Johann Weiss
by Merton and Frey
Armand E. Merten

Dec. 11, 1956 J. WEISS 2,773,617

HIGH-SPEED LABELING DEVICE

Filed July 29, 1955 9 Sheets-Sheet 4

Inventor:
Johann Weiss
by Mertens & Frey
Armand E. Mertens

HIGH-SPEED LABELING DEVICE

Filed July 29, 1955 9 Sheets-Sheet 5

Inventor:
Johann Weiss
by [illegible]
[illegible]

Dec. 11, 1956 J. WEISS 2,773,617

HIGH-SPEED LABELING DEVICE

Filed July 29, 1955 9 Sheets-Sheet 6

Inventor:
Johann Weiss
by Mertow & Frey
Attorneys

Dec. 11, 1956 J. WEISS 2,773,617

HIGH-SPEED LABELING DEVICE

Filed July 29, 1955 9 Sheets-Sheet 7

Inventor:
Johann Weiss
by Mertens and Frey
Armand E. Mertens

Dec. 11, 1956 J. WEISS 2,773,617

HIGH-SPEED LABELING DEVICE

Filed July 29, 1955 9 Sheets-Sheet 8

Inventor:
Johann Weiss
By Mastin and Frey
Arnold E. Nutter

Dec. 11, 1956 J. WEISS 2,773,617

HIGH-SPEED LABELING DEVICE

Filed July 29, 1955 9 Sheets-Sheet 9

Inventor:
Johann Weiss
by Mertens and Frey
Armand E. Mertens 2,773,617
Patented Dec. 11, 1956

2,773,617

HIGH-SPEED LABELING DEVICE

Johann Weiss, Berlin-Frohnau, Germany

Application July 29, 1955, Serial No. 525,306
Claims priority, application Germany February 23, 1955
15 Claims. (Cl. 216—13)

The present invention relates to a high-speed labeling device.

The device comprises a cylindrical labeling drum which continuously rotates on a vertical axis and which has a number of suction areas connected to a source generating a vacuum. One label at a time is received on the drum from a reciprocating container. The label is provided with glue, and is applied to a cylindrical workpiece when this meets the rotating labeling drum. During the application of the label to the workpiece, the vacuum is disconnected from the corresponding suction area.

It is an object of the present invention to provide a simple and efficient labeling device based on the above principle.

Labeling devices for upright cylindrical workpieces, such as bottles or cans, are known in several embodiments. In view of the high operational speed, a labeling device has proved very effective, that has an endless conveyor belt on which the workpieces to be labeled are caused to travel in a straight line past a constantly rotating drum, which feeds labels to the work pieces. The drum takes labels off a reciprocating container and holds them with the glued side placed outwardly.

In order to enable the drum, which feeds the labels to the work pieces, to take the labels out of the container and to hold them, the drum is provided with suction areas permeable for air and connected at the inside of the drum with a source providing a vacuum. When the reciprocating container approaches the drum, a suction area is capable of taking a label out of the container and holding it due to aspiration. If the labels are not gummed from the start, they are passed during the rotation of the drum by gluing rollers and glue is applied to their back. The suction area of the drum with the label adhering thereto then approaches the workpiece advancing on the conveyor in a straight line, which is then pressed against the labeling drum by an appropriate pressure-exerting device so as to roll along the surface to be labeled. While this rolling proceeds, the workpiece takes the label off the suction area of the labeling drum.

With these known labeling devices comparatively high labeling speeds may be attained. Operational speed, however, is limited by the fact that the workpiece can only be permitted to roll at a certain limit speed when taking the label off the suction area, in order to insure a dependable and accurate take-over of the label by the workpiece. During the rolling, the adhesion with which a label is held by the suction area, has to be overcome. For that purpose, the workpiece is required to remain in contact with the labeling drum for a certain period so that the workpiece can exert sufficient force on the label to counteract the adhesion on the suction area. It is therefore not possible to increase the rotational speed of the labeling drum and the number of workpieces to be labeled in a given time beyond a certain limit.

It has now been discovered that an increase in the operational speed can be accomplished by disconnecting the suction area from a source of vacuum while the label is taken off, whereby the workpiece is enabled to detach the label more readily and in a shorter time.

It is the object of the present invention to provide an especially accurate, simple, and rapidly operating device for the control of aspiration at the suction areas of the labeling drum for receiving the labels, as well as for other operations and for the delivery of the labels to the workpieces to be labeled.

According to the invention the labeling device comprises a labeling drum mounted on a shaft and having a plurality of suction areas; concentrically arranged with the shaft is a stationary duct which is connected with a source of vacuum and which is arranged on a portion of an annular member. The upper cover of the duct has a horizontal, plane outer surface which is connected by openings distributed over a circular ring with the duct. Attached to the ring is another ring forming with its horizontal and plane underface a packing, said ring being rigidly connected with the labeling drum. In said second ring perforations are provided which pass over the openings in the upper channel cover and are connected each with one suction area. In this way, it is not necessary to provide special movable valves for disconnecting, connecting, or controlling the suction, and it is therefore likewise possible to dispense with valve-operating equipment. It is furthermore possible in this way to make the suction at the suction areas of the drum stronger or less intense according to requirements. This is done by making the openings in the upper cover of the suction channel of different size and spacing, so that the suction area of the labeling drum will be subjected to a prescribed indraft in each angular position of the rotating drum. Since the resistance is highest at the place where labels are taken from a container by the drum, and the place where gluing occurs by the gluing roller, the openings are larger at these places than at any other spot in the path, where the labels are merely carried along. The arrangement of small openings over most of the path reduces considerably the danger of loss of suction by leakage.

A further feature for maintaining the rate of suction comprises interrupting the channel at a place between the label container and the gluing device so that two separate channel portions will be provided which are both connected to the source of vacuum. This results in the fact that no considerable loss in suction will occur in the area where gluing is performed, when upon delivery of labels from the container some leakage occurs in the suction areas of the drum. The just described measure also prevents that the rate of suction decreases at those suction areas which have already taken a label from the container, so that labels will not fall off when one particular suction area, for some reason or other, does not detach a label from the container and remains open.

The novel labeling device is particularly adapted for the simultaneous application of two labels onto a workpiece, for instance for applying to a bottle a label on the body and on the neck in vertically registering positions. For that purpose, two sets of suction areas are provided vertically above each other and working independently. The upper cover of the channel has several rows of openings, each row being associated with one set of suction areas, and the ring rotating on the upper channel cover having corresponding perforations connected with the several suction areas by coupling tubes. Since both labels can be taken over simultaneously by the vertically aligned suction areas of the drum, only one container of labels is necessary in which the labels are arranged in appropriately spaced relationship.

For delivering the labels for the neck of the bottle, where a distance between the container and the neck has to be bridged in order to place the label on the bottle, a slideable label support controlled by a cam is provided which permits an accurate placing above the center of the body label.

The labeling device according to the invention will now be more fully described with reference to the accompanying drawings, but it should be understood that these are given by way of illustration and not of limitation and that many changes can be made in the details without departing from the spirit of the invention.

Figures 5, 6, 7:
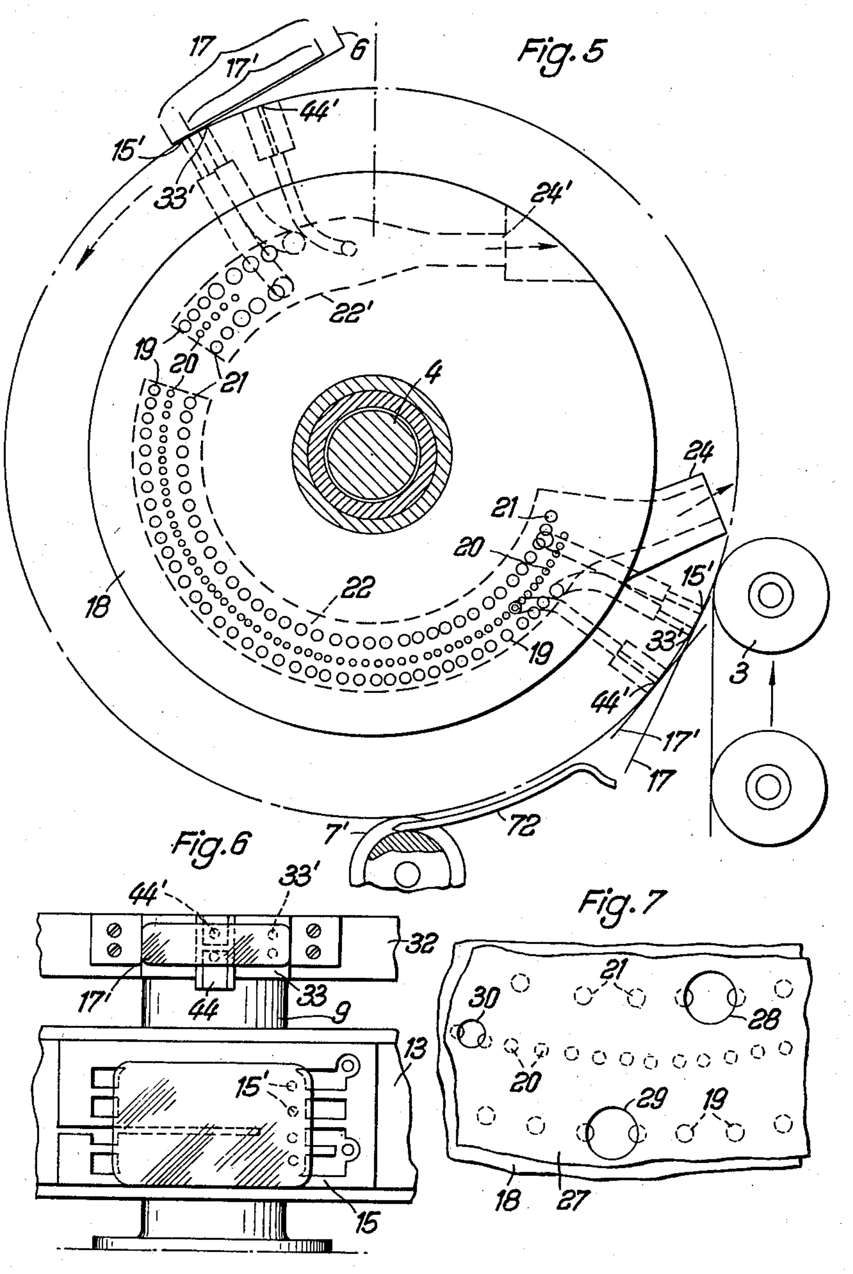
Figure 8:
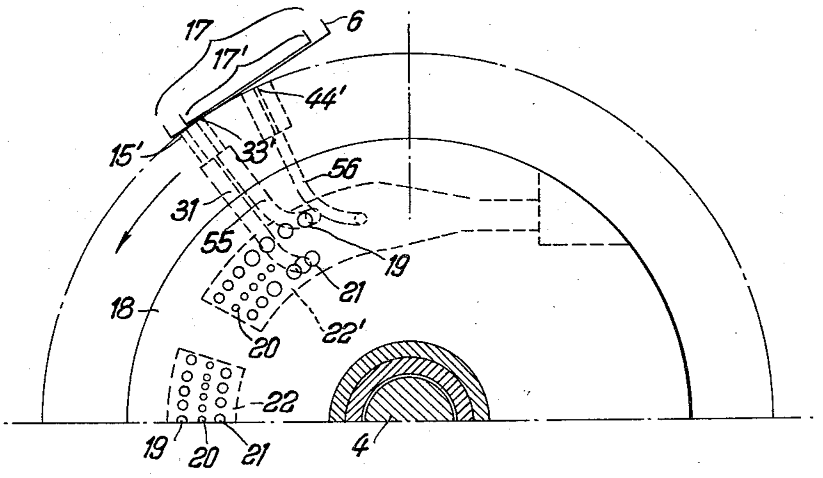
Figure 9:
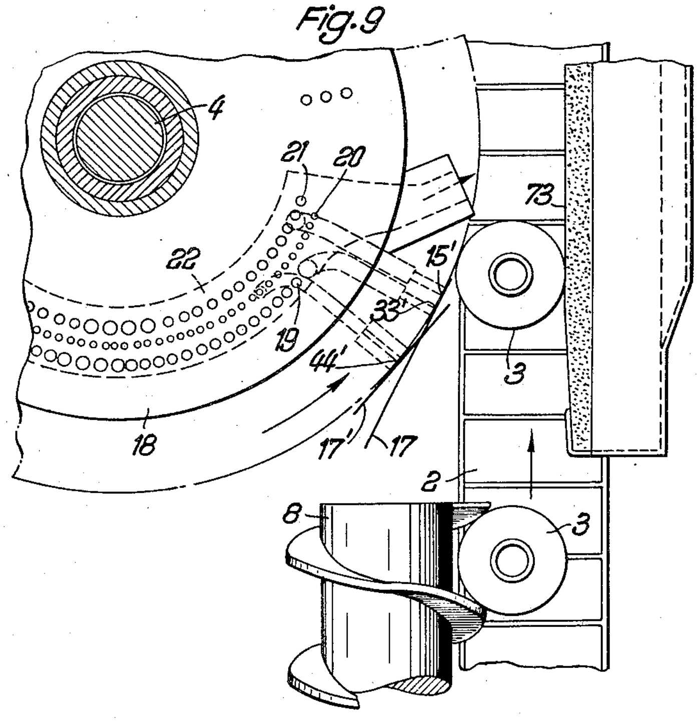
Figure 10:
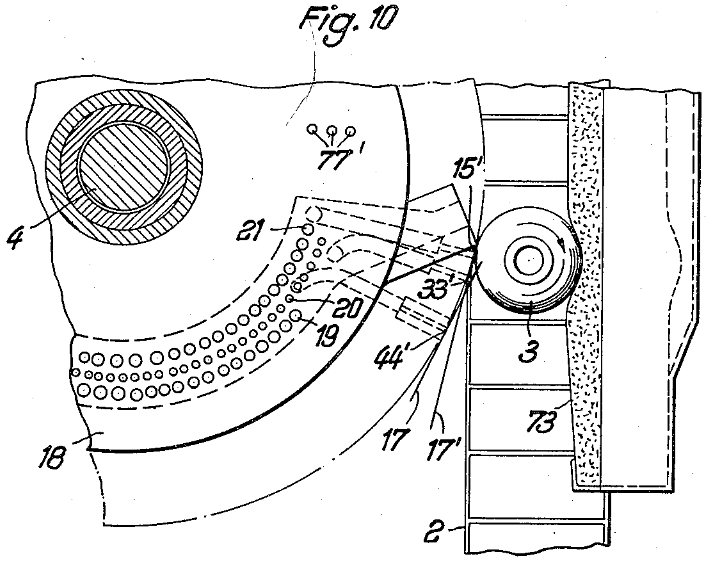
Figure 11:
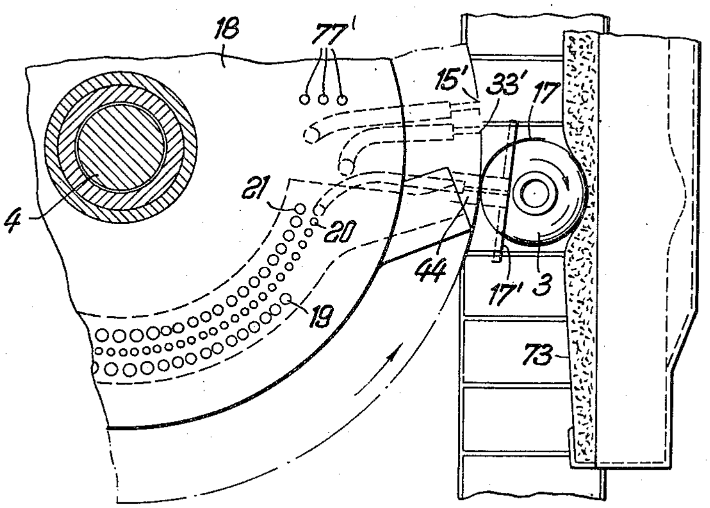
Figure 12:
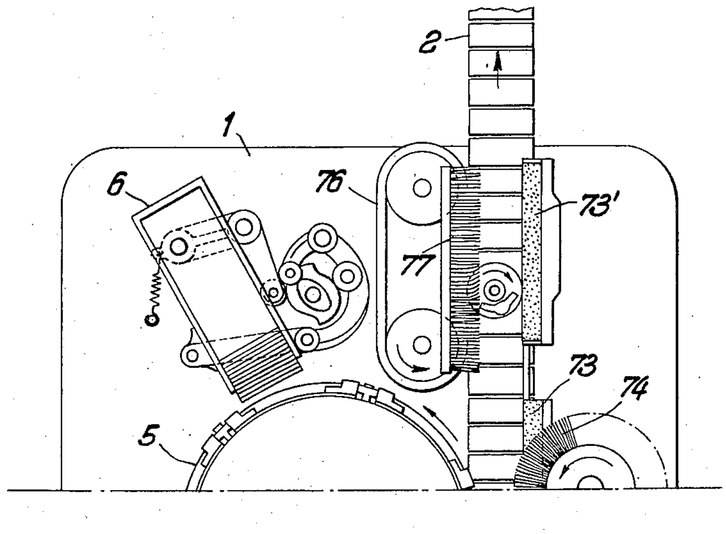
Figure 13:
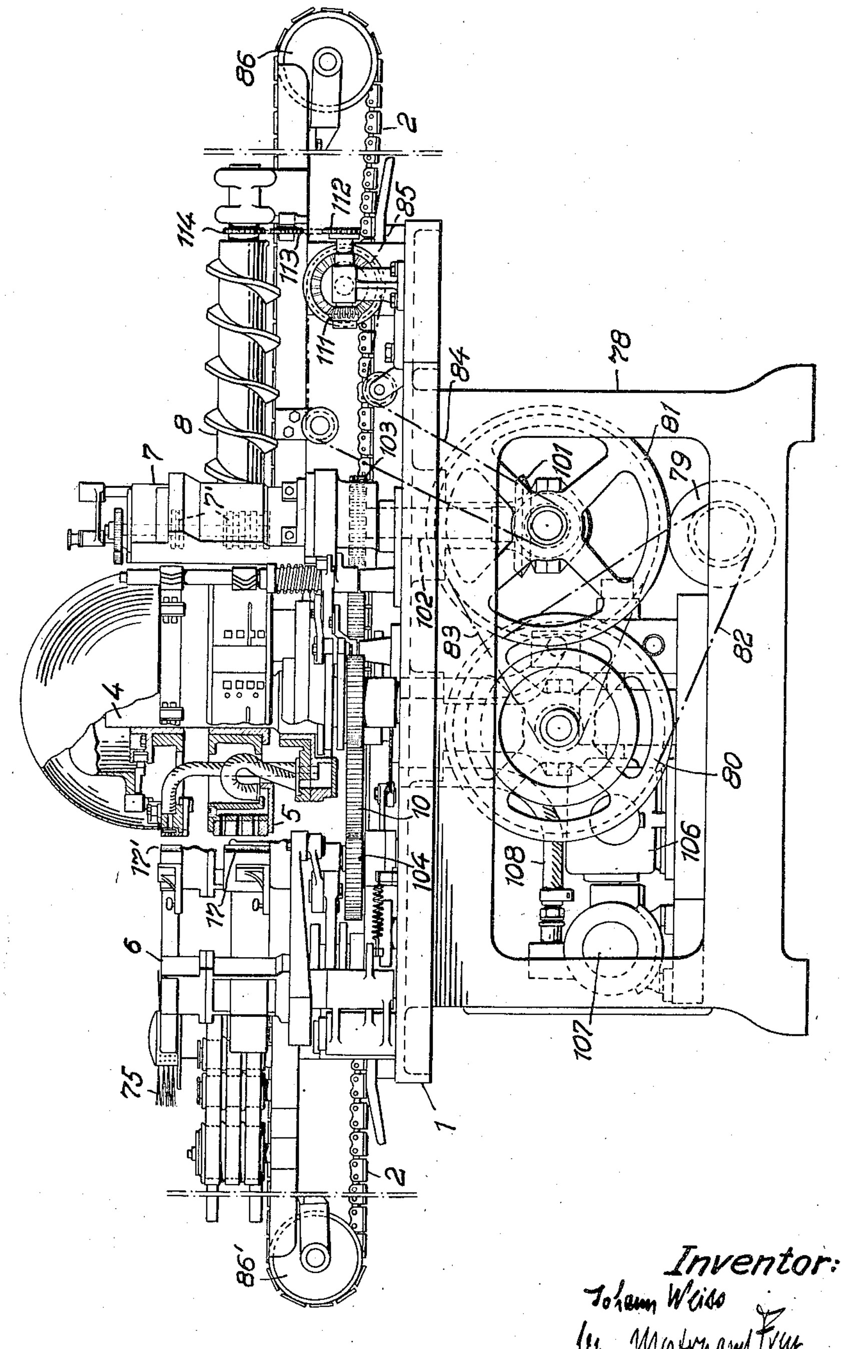

Fig. 5 diagrammatically shows how a label is taken from the container and is delivered to the workpiece to be labeled;

Fig. 6 illustrates the two sets of suction devices arranged one above the other on the labeling drum;

Fig. 7 is a partial showing of the two rings sliding upon each other with their suction openings;

Fig. 8 is a diagrammatic showing how the labels are taken from the container in a position of the suction areas following the one of Fig. 5;

Figs. 9 to 11 show delivery of the labels to the workpiece in successive stages;

Fig. 12 is a different embodiment for the application of the label to the neck of a bottle;

Fig. 13 illustrates the entire device in front elevation; and

Figure 14:
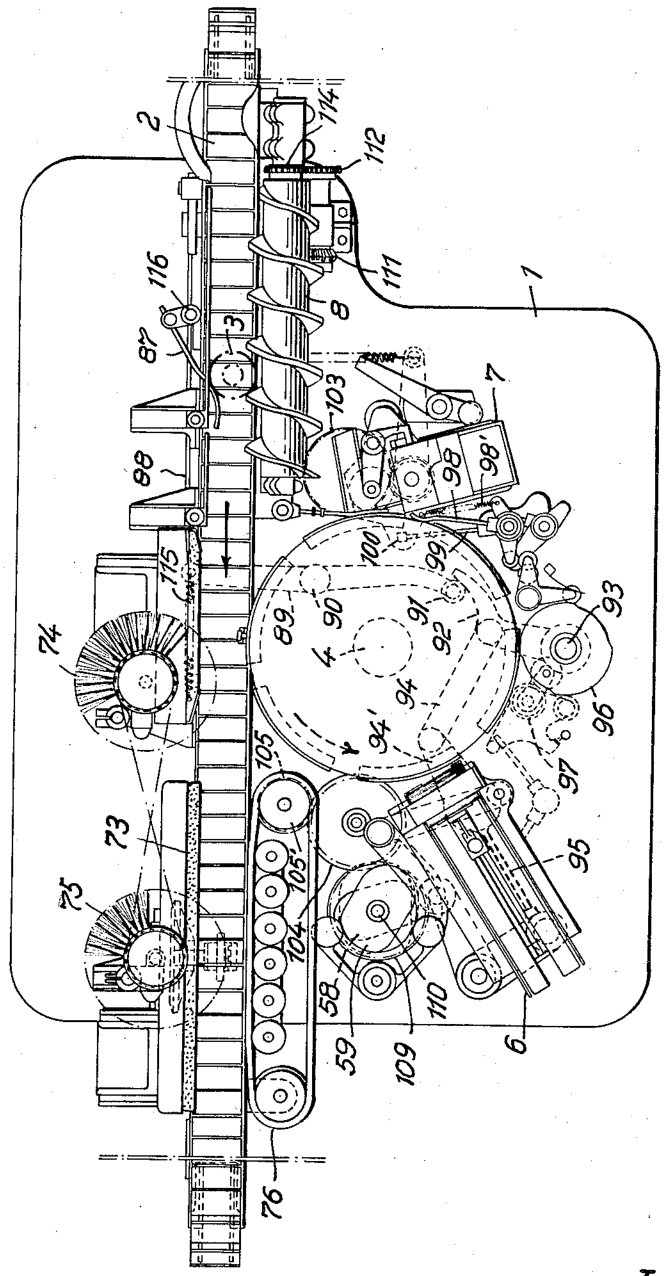

Fig. 14 in top plan view.

Figure 1:
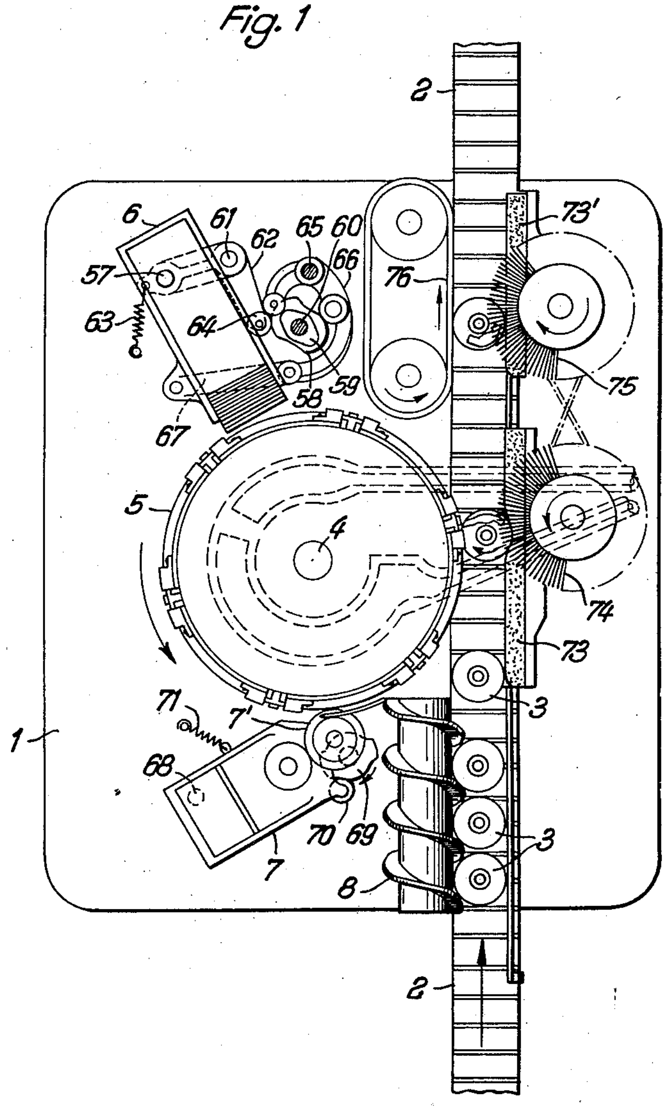
Fig. 1 is a diagrammatic showing in plan view of a labeling device according to the invention.

Referring now to Fig. 1 of the drawings, the device comprises a table 1, on which a labeling drum 5 is mounted on a vertical shaft 4. Passing the drum above the table is a conveyor 2 on which are travelling workpieces 3, for instance bottles, to be labeled. Instead of bottles, other cylindrical objects, e. g. cans and the like, can be labeled by the device. The drum takes a label at a time from a box 6 by suction created in the interior of the drum; the label is gummed from a gumming device 7. When the drum feeding a label to a workpiece 3 meets the latter, the gummed label is passed over thereto, suction being disconnected from the drum at this time. A worm 8 arranged next to the conveyor 2 controls the feed and proper spacing of the workpieces 3. In the example here described, the bottles are provided with a label at the body and one at the neck portion.

Figure 2:
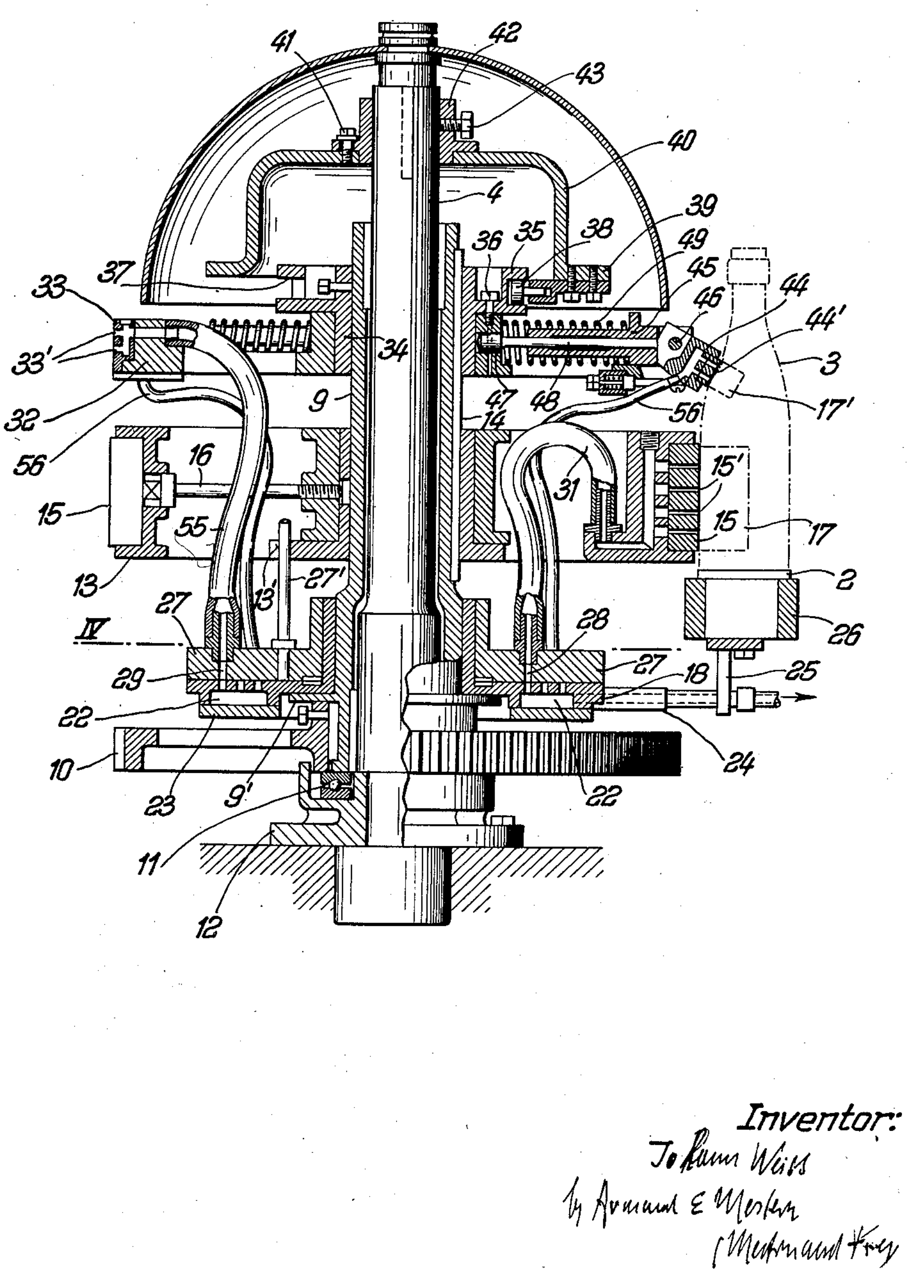
Fig. 2 is a longitudinal section through the device.
Figure 3:
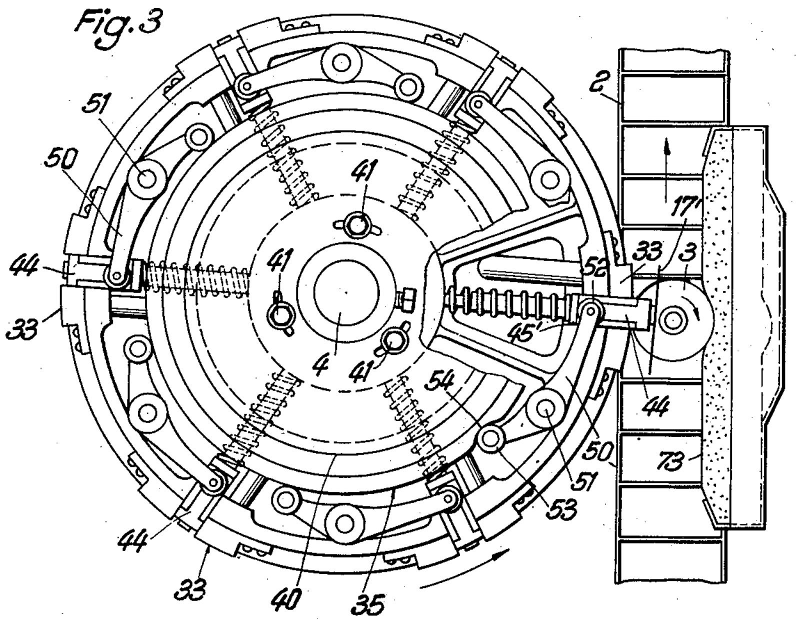
Fig. 3 is a plan view showing the labeling drum after removal of the outer casing.
Figure 4:
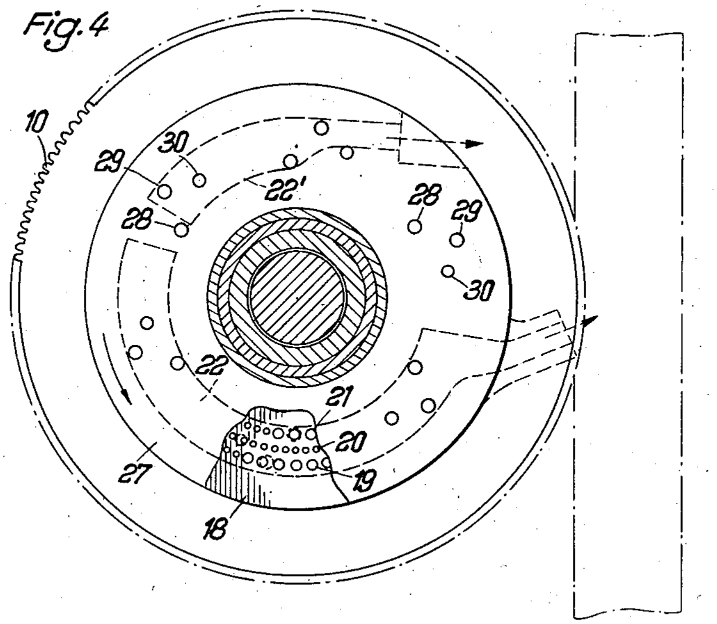
Fig. 4 is a section along IV of Fig. 2.

Further details of the labeling drum are shown in Figs. 2–4. On the stationary shaft 4, a hub 9 is arranged for easy rotation which engages at its bottom portion with a gear 10 from which the drum 5 is driven, said drum being mounted on a ball bearing 11 in the base 12 of shaft 4.

A spider 13 is mounted on hub 9 and coupled by groove and tongue joint 14 therewith. The spider 13 has on its outer face evenly distributed segments 15, six in this particular example, provided with suction channels 15'. The spider 13 is axially adjustable with respect to hub 9 and can be fixed in any desired height by a threaded pin 16 which is pressed against the hub. The segments 15 serve for taking body labels 17 out of the box 6 (Fig. 1) and applying the same on the bottles 3.

Below the spider 13, a stationary plate ring 18 is mounted on a flange 9' of the hub 9. The ring 18 has a duct connected to the source of vacuum, the duct being provided at the top with a cover forming a horizontal even outer surface having openings 19, 20, and 21 distributed in circles which are concentric to the drum axis and which lead to the duct below. The duct is interrupted at one point so that two parts 22, 22' are formed which are connected at 24 and 24' to a source of vacuum (not shown in the drawing). Each part of the duct is covered at the bottom by a plate 23. A rotation of the plate ring 18 is prevented by holding the tube connection 24 leading from the duct to the source of vacuum by a prong 25 fixed to a rail 26 on which the conveyor 2 is traveling.

On the plate ring 18, a ring 27 coupled with spider 13 is mounted, which forms a seal with its plane horizontal underside for ring 18 and rotates therewith. Ring 27 is taken along in the rotation by a bolt 27' screwed to the ring and engaging in a slot 13' of spider 13, at the same time allowing adjustment of height of said spider. In accordance with the number of suction areas, openings 28, 29, and 30 are provided which are so aranged that as the device rotates, each opening communicates with a row of the openings 19, 20, and 21, which are distributed in a circle (Fig. 4).

Each of the segments 15 arranged on spider 13 communicates by means of a flexible tube connection with one of the openings 28 which rotate over openings 21 of the plate ring 18. The vacuum maintained in ducts 22 and 22' causes the body labels 17 to be sucked from channels 15' of segments 15.

For placing the neck labels 17' on the bottles 3, a second spider is provided above spider 13. This spider 32 has suction areas 33 on its outer face vertically above segments 15. Since, however, contrary to the body labels, the labels for the neck cannot be passed onto the bottle immediately, due to the inclination and the distance between the neck and the label carrier, additional means are provided for fixing the last mentioned labels on the bottle.

Spider 32 is mounted on a sleeve 34 slipped onto hub 9 which has a flange 35 receiving screws 36 for connection to spider 32. The flange 35 has on its outer rim an annular groove 37 which engages with one or several rollers 38; the latter are attached to flange 39 of a bell-shaped member 40 secured to shaft 4. Bell 40 is axially slideable on the shaft so that by way of rollers 38 the sleeve 34 and therewith spider 32 can be adjusted to the desired position with respect to bottle 3. By means of screws 41, the bell-member 40 is connected to a sleeve 42 which is secured in adjusted position on the shaft by tightening a nut 43.

In order to bridge the space between the neck of the bottle and the suction area 33, when a label is to be affixed at the neck of the bottle, a label carrier 44 provided with suction openings 44' is arranged for holding the label centrally in addition to the suction openings 33' (see Fig. 6) holding the label near the front edge; the label carrier 44 is radially displaceable with respect to the drum and can be tilted vertically. The carrier 44 is rotatable on a pin 46 on the outer end of a sleeve 45 which is guided on a rod 48 extending between the spokes of spider 32 and fastened at 47. A helical spring 49 arranged on sleeve 45 tends to push the sleeve with the label carrier 44 to the outside and is prevented in this action by a double lever 50 which is pivotally mounted on a pin 51 on spider 32. The double lever lies, by means of a roller 52, with one arm in abutment in front of a stop 45' of sleeve 45, and with the other arm, by means of a roller 53, is abutting against the flange 39 of the stationary bell 40. The flange is provided with an indentation 54 into which roller 53 of the double lever slides under the action of spring 49 when the labels, upon rotation of the drum, meet the bottles on the conveyor, so that the carrier 44 is moved in the direction of the bottles and affixes the label thereon.

The suction openings 33' of the spider 32 are connected by a hose 55 with the openings 29 of ring 27 rotated by means of plate ring 18, whereas the suction openings 44' of the movable label carrier 44 are connected separately by a hose 56 with openings 30 in order to make possible in this way an independent control of suction.

Control is effected by the arrangement of the openings 19, 20, 21, distributed on plate ring 18 and lying above the suction duct. It depends on the operator to determine the spot where suction is to begin and where the source of vacuum is to be disconnected. It is a further advantage of the device that the intensity of suction can be regulated, while the drum is rotated, by the size of the openings. As Fig. 5 shows, the openings at the place where labels are taken from container 6 and at the place where gumming of the labels occurs by roller 7', are larger than at other parts of the travel. Preferably, the spacing of the openings within one row 19, 20, 21, is so chosen that the openings 28, 29 and 30 passing thereover are constantly in connection with the suction (see Fig. 7).

For delivering labels to the suction areas of the drum there is only one box 6 provided which contains the two kinds of label, namely the body labels and the neck labels vertically superposed separately and in spaced relationship at appropriate heights. In the delivery of the labels, the box performs a reciprocating movement in the direction to and from the drum and in addition thereto an oscillating movement of the same frequencies on an axis 57 (Fig. 1), which is parallel to shaft 4, in such a manner that the label box is tilted in the direction of the facing suction area, when it is nearest to drum 5.

The control of the movement of box 6 is performed by cams 58 and 59 mounted on a shaft 60 and driven in synchronism of the movement of drum 5 by gears not shown in the drawing. Shaft 57 supporting the label box 6 is mounted on a toggle lever 62 journalled on a pin 61; under the action of a spring 63, lever 62 engages with cam 58 by means of a roller 64, imparting to box 6 a movement in the direction of drum 5. A toggle lever 66 mounted on a pin 65 and connected by a rod 67 with box 6, imparts an oscillating movement to said box, the control in this case being accomplished by cam 59.

Figs. 13 and 14 show the complete arrangement of the device according to the invention in front elevation and plan view. These two figures illustrate the kinetics of the several parts of the labeling device and their cooperation.

As already mentioned, the labeling device proper is mounted on a table 1 which in turn is arranged on a standard 78. In the standard, an electromotor 79 is housed which is the drive means for all the moving parts of the machine. The motor 79 drives by means of a belt 82 a reducing gear 80, which in turn drives another reducing gear 81 by means of a belt 83. Gear 81 drives a belt 84 which rotates a gear 85 driving the conveyor belt 2. The belt 2 is an endless one traveling on guide rollers 86 and 86'. Further associated with the reducing gear 81 is a bevel gear 101 which moves a gear 103 over a shaft 102. Gear 103 engages with the large gear 10 to which the labeling drum 5 is secured and with which it rotates.

Gear 10 in turn rotates a gear 104 which drives a gear 105. Coaxial with gear 105 is a drum 105' over which an endless pressure belt 76 is traveling which is driven by the said drum.

Gear 104 further drives a gear 109 on whose shaft 110 cams 58 and 59 for the control of box 6 are fixedly mounted.

Furthermore, in standard 78 an electromotor 106 is arranged which operates a suction pump 107. The reduced pressure generated by this pump is connected by a hose 108 with a connecting member 24' of the labeling drum 5 which has been described more specifically above.

The cylindrical workpieces 3 to be labeled arrive from the right-hand side to the conveyor belt 2 traveling from right to left and are moved from there into a worm 8 which positions the individual workpieces 3 in the proper distance from each other.

The worm 8 is rotated by way of the gear 85 and gear train 111, 112, 113 and 114. Worm 8 causes workpieces 3 to be labeled to pass a feeler 87 having its free end pressed into the path of the pieces to be labeled by a spring 115. Spring 115 acts on a rigid rod 88, which is linked to the other end of feeler 87 by a member 116. Furthermore, the free end of rod 88, which is distant from feeler 87, is pivotally connected to a lever 89.

As long as the feeler 87 is not pushed aside by a workpiece 3, it automatically bars the movements of the labeling box 6 and prevents a pressure member 97 from bearing against the outer circumference of drum 5. This purpose is served by lever 89 linked to rod 88, said lever being rotatable on a fixed point 90. On the other end of lever 89, there is a roller 91 which presses against a bent lever 92; the latter is pivoted on a stationary shaft 93 on a control disk 96, and by the movement of lever 92 the pressure member 97 is lifted from drum 5, as long as feeler 87 projects into the path of workpieces 3.

To the bent lever 92, another lever 94 is pivotally connected which blocks box 6 by means of a further lever 94' journalled thereto and by a rod 95, as long as feeler 87 projects into the path of workpieces 3.

Only when a workpiece 3 pushes feeler 87 aside, will the described movements of the above mentioned levers set free the label box and will pressure member 97 be brought to bear on the labeling drum 5. In order to prevent the gumming roller 7' from smearing the drum 5 with glue, when no label 17 or 17' is present on the drum, a further feeler 98 is provided which is pressed against drum 5 under the action of a spring 98'. When no label is present on the drum, feeler 98 can be pivoted slightly in the direction of shaft 4 and thereby blocks the gluing box 7 by means of a bar 99 by hitting a stop member 100 rigidly connected to the glue box 7. In this manner it is avoided that the box 7 together with the gluing roller 7' is pivoted in the direction of drum 5 and that roller 7' gets in contact with the circumference of drum 5.

The operation for providing a body label and a neck label onto the drum is as follows:

As shown in Fig. 5 the label box 6 takes up the position in which the movement to the drum 5 has been completed by lever 62 controlled by cam 58 (Fig. 1). At the same time, by rotation of the drum, the suction openings 15' are being connected with the first opening 21 by means of the connection tube, so that the body label 17 is aspirated near its front edge. Suction openings 33' and 44' have not yet reached the associated openings 19 and 20 for the attachment of vacuum. Due to a thrust of lever 66 (Fig. 1), the label box will subsequently be moved along for a while in the direction of the drum. During this movement, tube 55 has reached the connection with the first opening 19, so that openings 33' will aspirate the neck label 17', as shown in Fig. 8. After the label box is returned, label 17' aspirated by openings 33' is further carried toward openings 44' with its central portion as openings 20 are connected to openings 44' by tube connection 56.

The short interruption of the suction between the two duct portions 22 and 22' does not cause the labels to drop off, due to the ring 27 forming a packing while sliding on plate ring 18, so that the vacuum in the tube connections remains unimpaired.

While passing the glue dispenser 7, the labels are provided with glue on their rear side by roller 7'. This device is pivotally mounted by means of pin 68 on table 1 (Fig. 1) and is controlled by a cam 69, a roller 70 being provided which engages with the device on the action of a spring 71, so as to oscillate toward the drum 5 and back. A wiper 72 arranged near the gluing roller 7', and shown in Fig. 5, prevents the label from sticking to the gluing roller.

Ahead of the glue dispenser, a feeler may be arranged on the table passing the drum laterally and preventing the approach of the glue dispenser to the drum when no label passes the feeler.

The succession of steps whereby a label with glue on its back is applied to a bottle is illustrated in Figs. 9, 10 and 11. The worm 8, as mentioned before, controls the spacing of bottles 3 fed toward the drum on conveyor 2. A wall 73 of foam rubber or the like is arranged opposite drum 5 for gently pushing the bottle into contact with the drum. As shown in Fig. 9, labels 17 and 17' are in position slightly ahead of the bottle when the latter contacts the drum. In this position, openings 33' release the neck label 17' at the front edge, since the connection with the openings 19 at the end of this row has been interrupted, while the center portion of label 17' is still held by openings 44'.

As the drum continues to rotate, the body label 17 held at its front edge by suction openings 15' meets the bottle. Simultaneously, vacuum is interrupted by the tube connection being detached from openings 21 (Fig. 10), so that the bottle 3 now rolling between the drum and the abutment wall 73 takes off the label 17.

At the time when the bottle meets the center of neck label 17', which is in accurate alignment with the center of the bottle label, the label carrier 44 is projected toward the bottle (Fig. 11) and vacuum is disconnected by the tube connection leaving openings 20.

A rotating brush 74 (Fig. 1) presses the free front edge of the body label, which is only held against the bottle by its center, against the wall of the bottle while it rolls along wall 73.

The free rear end of the label is applied against the bottle by a second brush 75 which rotates in opposite direction to the first brush, while the bottle rolls along a second cushioned wall 73' and an abutment formed by an endless belt 76.

Instead of brush 75, a stationary flat brush 77 can be arranged on the endless belt 7, as shown in Fig. 12, which brushes the neck label onto the rotating workpiece advancing in a straight line.

After the labels are applied to the bottle, the tube connections communicating with the labeling drum pass by openings 77' provided on the plate ring 18 through which air is blown in order to keep the suction pipes free.

It should be understood that the suction areas on the drum and on the spiders 13 and 32 can be exchanged when desired.

What I claim is:

1. A high-speed labeling device comprising a labeling drum having a plurality of suction areas, a vertical shaft for mounting said drum for continuous rotation, a source of vacuum for generating suction at said suction areas, and flexible tube connections associated with the source of vacuum for that purpose, a feed box for labels to be delivered to the suction areas of said drum in timed relationship with the rotation thereof, means for feeding workpieces to be labeled past said drum, and means for temporarily disconnecting said suction areas of said drum from the source of vacuum, said device further comprising a stationary duct concentrically arranged with the shaft of the labeling drum, means for connecting said duct with said source of vacuum, an upper horizontal cover with a plane outer surface for said duct having openings distributed in rows along a circular ring, a second ring above said first ring and rigidly connected to said labeling drum, said second ring having a plane horizontal lower face forming a seal on said first ring while the rings rotate together, said second ring having perforations which are connected each with one suction area of said drum and pass over successive openings in said cover.

2. A labeling device according to claim 1, wherein the openings in the upper cover of the suction duct are of different size and spacing along the periphery of the first ring so that the suction areas of the labeling drum are subjected to a prescribed indraft in each angular position of the rotating drum.

3. A labeling device according to claim 2, which comprises a glue dispenser with associated roller for applying glue to the back of said labels, wherein the duct is interrupted at a place between the feed box for the labels and the glue dispenser, so that two separate channel portions are formed which are both connected with the source of vacuum.

4. A labeling device according to claim 3, wherein the openings in the upper cover of the suction duct are of larger size at the place where labels are taken from the feed box and at the place where glue dispensing occurs, than at any other spot of the ring.

5. A labeling device according to claim 1, wherein each connection between said ring and said suction areas of the labeling drum contains a flexible tubing.

6. A labeling device according to claim 1, wherein the suction areas are exchangeable.

7. A labeling device according to claim 1, wherein means are provided which move the label feed box in addition to the reciprocating movement toward and away from the labeling drum, in an oscillating movement of equal frequency around an axis which is parallel to the axis of said drum, in such a manner that the label feed box is tilted in the direction of the facing suction area when it is nearest to the labeling drum.

8. A labeling device according to claim 7, wherein two levers independent from each other are provided on which the otherwise freely movable box is pivoted, and arms for controlling the ends of said levers, one of said levers causing the reciprocating movement of the label feed box and the other lever causing the tilting movement.

9. A labeling device according to claim 1 for the simultaneous application of two labels on a workpiece in vertical alignment, said device providing two spiders, each with a set of suction areas independent from the areas of the other spider, wherein the upper cover of the suction duct has openings in at least two concentric rows, each of which is cooperating with one set of suction areas, and wherein the second ring arranged above said duct cover has openings for registration with said several suction areas.

10. A labeling device according to claim 9 wherein the set of areas for applying the upper one of the vertically aligned labels is divided into two portions, one suction area portion being provided with a radially stationary ring member having suction openings for holding the rim of a label, and said other suction area portion being associated with a radially projectable label carrier likewise provided with suction openings, said latter openings being capable of holding the central portion of the label.

11. A labeling device according to claim 10 wherein separate flexible tube connections are provided for the radially stationary ring and the radially projectable label carrier, each tube being connected to one row of openings in the upper cover of the suction duct during rotation of the drum.

12. A labeling device according to claim 10 having a spring for forcing the projectable label carrier radially outwardly against the action of a cam-controlled lever tending to force said carrier inwardly but releasing the carrier for label application when opposed by said workpiece.

13. A labeling device according to claim 10 wherein the connecting tube between the suction duct and the stationary ring with suction openings is detached shortly before the projectable carrier of the upper label is moved outwardly.

14. A labeling device according to claim 13 wherein means are provided for tilting said projectable carrier on a horizontal axis.

15. A labeling device according to claim 9 wherein the suction areas on both spiders are exchangeable.

References Cited in the file of this patent

UNITED STATES PATENTS

| | | |
|---|---|---|
| Re. 24,097 | Von Hofe | Nov. 29, 1955 |
| 2,565,975 | Lissimore | Aug. 28, 1951 |

FOREIGN PATENTS

| | | |
|---|---|---|
| 1,096,263 | France | Jan. 26, 1955 |